July 27, 1954
J. C. STOKES
2,684,851
PRACTICE OR TOURNAMENT PLUG
Filed Oct. 10, 1952
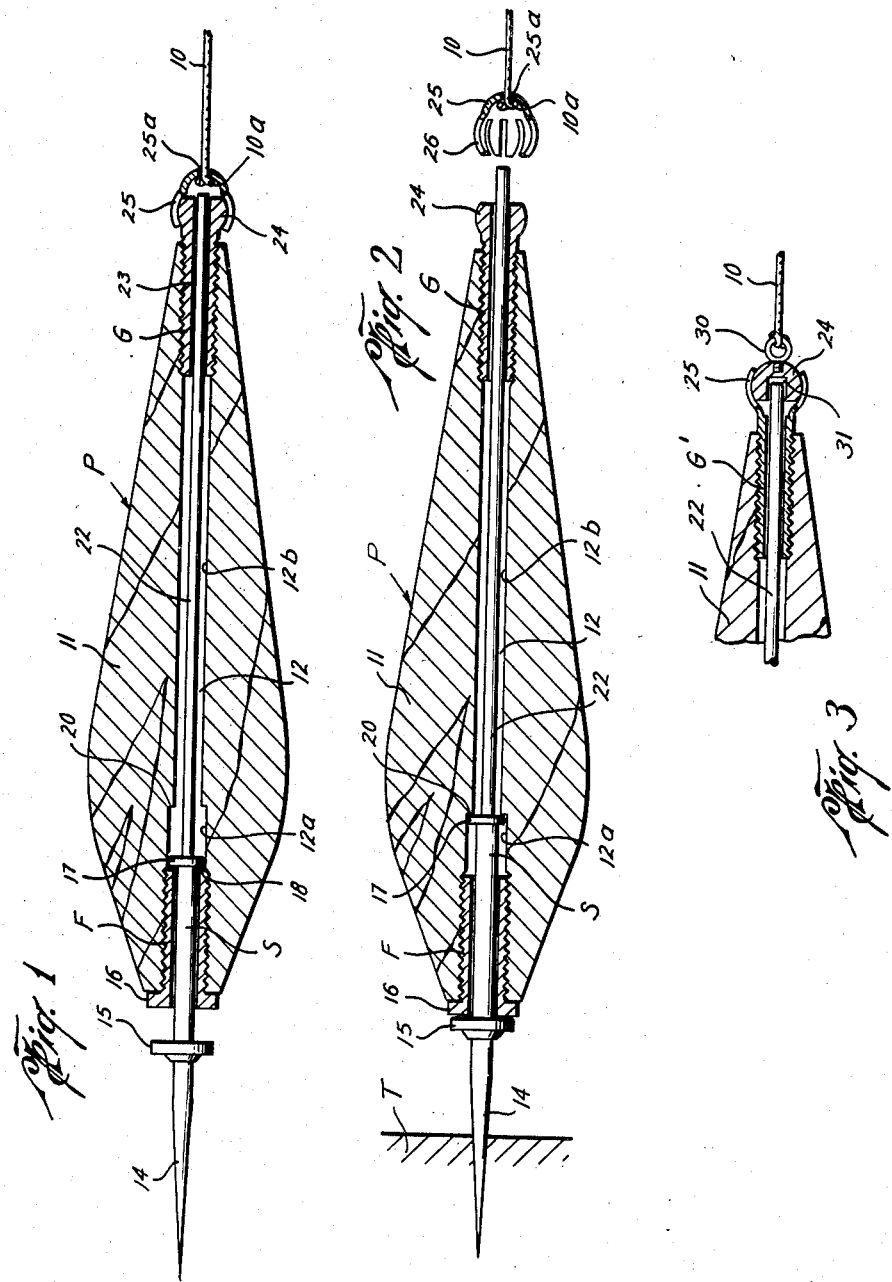
John C. Stokes
INVENTOR.
BY J. Vincent Martin
Joe E. Edwards
B. R. Pravel
ATTORNEYS Patented July 27, 1954

2,684,851

UNITED STATES PATENT OFFICE 2,684,851

PRACTICE OR TOURNAMENT PLUG

John C. Stokes, Houston, Tex.

Application October 10, 1952, Serial No. 314,038

8 Claims. (Cl. 273—106.5)

This invention relates to new and useful improvements in practice or tournament plugs.

An object of this invention is to provide an improved tournament or practice plug which is automatically releasable from the fishing line when a practice cast is made, leaving the plug in the target.

An important object of this invention is to provide an improved practice or tournament plug for use with conventional fishing rods and reels wherein the plug is adapted to stick in a target when a practice cast is made with the rod and reel and thereafter to automatically release from the fishing line leaving the plug in the target to register the accuracy of the cast.

Another object of this invention is to provide an automatically releasable tournament or practice plug which can be manufactured cheaply and in weights comparable to those now used for tournament or practice casting.

The construction designed to carry out the invention will be hereinafter described together with other features thereof.

The invention will be more readily understood from a reading of the following specifications and by reference to the accompanying drawings forming a part thereof, wherein an example of the invention is shown, and wherein:

Figure 1 is a sectional view of the tournament or practice plug of this invention, illustrating the position of the parts during the cast of the plug toward the target.

Figure 2 is a view similar to Figure 1, illustrating the plug stuck in the target and the release of the plug from the fishing line.

Figure 3 is a partial view illustrating a modified form of the releasable connection between the fishing line and the plug.

In the drawings the letter P generally indicates the tournament or practice plug of this invention and the letter T designates the target. The tournament plug P is connected to a fishing line 10 which is attached to the reel and rod (not shown). The plug P is cast in the usual manner with the rod and reel toward the target T, which target may be made of wood or any similar material. The object of course is to control the point at which the plug hits the target, which is indicative of the accuracy of the cast. As will be explained, the plug of this invention is adapted to stick in the target T and to thereafter automatically be released from the line 10 so that the plug P remains on the target to indicate the accuracy of the cast.

The practice plug P has an elongate streamlined body 11 which is preferably formed of wood or any similar material of suitable weight. The body 11 of the plug has a longitudinal opening 12 extending through the center thereof. Such longitudinal opening 12 may have a forward end 12a of increased internal diameter as compared to the rear end 12b of the opening. The opening 12 has a shaft S extending therethrough, and such shaft has a pointed end 14 which extends from the forward end of the plug body 11. The pointed end 14 is of course adapted to stick in a target T as illustrated in Figure 2. Mounted on the shaft S is a radial projection or flange 15 which serves as a stop member to limit the inward longitudinal movement of the shaft S with respect to the plug body 11. This stop member 15 contacts a radial flange 16 on an insert F which is threaded into the large diameter forward portion 12a of the longitudinal opening 12. As will be appreciated the contact of the stop means or member 15 with the shoulder or flange 16 limits the inward movement of the shaft S with respect to the plug body 11.

Also disposed on the shaft S is an inner flange 17 which limits the outward movement of the shaft S with respect to the plug body 11 by its contact with the inner end 18 of the insert F. Upon the rearward movement of the shaft S with respect to the body 11, the flange 17 may also serve as a stop member to limit the rearward movement by its contact with the shoulder 20 formed in the longitudinal opening by the reduced diameter portion 12b. Of course, such shoulder 20 is not necessary to stop the rearward movement since the outer flange 15 serves such purpose when it contacts the shoulder 16 on the insert F. If the shoulder 20 were relied upon to stop the rearward movement of the shaft S with respect to the body 11 upon contact of the inner flange 17 therewith, it will be appreciated that the outer stop member 15 could be eliminated. However, it is preferable to have the outer stop member 15 serve to limit the rearward or inward movement of the shaft S because of its contact with the metal shoulder 16 whereas the inner flange 17 contacts with the wooden shoulder 20 which of course could not withstand repeated contact by the flange 17.

It will be observed that the inner portion of the shaft S is shown as being of a reduced diameter as compared to the forward portion including the pointed end 14. This inner portion 22 of the shaft S may be of the same diameter if desired but preferably it is formed of a material such as stiff wire or a rod which can be connected by soldering or otherwise at the inner flange 17. The inner portion 22 of the shaft S extends through an insert G on the rear end of the plug body 11, which insert G is threaded into the rear portion 12b of the longitudinal opening 12. The insert G has a longitudinal opening 23 extending therethrough which is aligned with the longitudinal opening 12 and is of sufficient diameter to receive the inner end 22 of the shaft S. As shown in Figures 1 and 2 the insert G has a knob 24 on its outer end which knob is substantially spherical in shape. The knob 24 is adapted to receive a resilient socket 25 which has connection with the fishing line 10.

As can be seen the fishing line 10 may be connected to the socket 25 by a knot 10a formed inside of the socket with the line 10 passing through an opening 25a in the socket. The socket 25 includes a plurality of spaced and curved fingers 26 which are resilient and are of sufficient strength and size to fit over the knob 24 so as to grip such knob and establish a releasable or detachable connection between the plug body 11 and a fishing line 10.

In the use of the practice or tournament plug of this invention, it is connected to the line 10 which extends to the rod and reel (not shown). Upon casting the plug with the rod and reel in the usual and well known manner, the plug passes through the air and is directed toward its target T. As pointed out above these targets are generally of wood or similar material. During the flight of the plug through the air toward the target, the shaft S is extended forwardly in the position shown in Figure 1 with the inner flange 17 limiting its forward position relative to the plug body 11. The resilience of the socket 25 is sufficient to prevent the separation of the plug body 11 from the line 10 during the casting.

When the plug hits the target the pointed end 14 enters the target and sticks therein, thus stopping the movement of the shaft S. The inertia of the forward movement of the plug body carries same forward until the shoulder 16 hits the stop member 15. This of course effects a relative longitudinal movement between the shaft S and the plug body 11 and causes the shaft S to project beyond the end of the knob 24 and into contact with the socket 25 with sufficient force to release the socket 25 from the knob 24, as best shown in Figure 2. Once the line 10 is released, the reel can be operated to pull the line 10 and the socket 25 toward the user, leaving the plug P sticking in the target T to indicate the accuracy of the cast. Another plug may then be connected to the socket 25 and another cast made in the same manner as above described. It should be pointed out that the resiliency of the fingers 26 of the socket 25 should be of such strength that the socket 25 will not be released from the knob 24 if the plug misses the target and hits the water or soft ground. Thus, the user may retract the plug and try another cast for the target T.

It will be appreciated that other types of releasable connections than the ones shown in Figures 1 and 2 may be utilized so long as it is released upon the sticking of the pointed end 14 of the plug in the target. For example in Figure 3, the socket 25 is shown as being on the end of the insert G'. This socket 25 on the insert G' is substantially the same as to socket 25 shown in Figures 1 and 2 and is adapted to be disposed about a knob 24 which has an eye or hook 30 connected thereto by threads or any other suitable means. The hook 30 is adapted to have the line 10 tied thereto. In this form of the invention shown in Figure 3 the knob 24 would of course not have an axial or longitudinal opening all of the way therethrough but instead would have a recess 31 into which the rear end 22 of the shaft S is adapted to fit, so that movement of the shaft rearwardly will force the knob 24 from its releasable connection with the socket 25 to release the line 10 from the plug. It is evident that the recess 31 is not necessary since the rear end 22 of the shaft could be shortened to abut against a flat inner surface of the knob 24 if desired.

The foregoing disclosure and description of the invention is illustrative and explanatory thereof and various changes in the size, shape and materials, as well as in the details of the illustrated construction may be made, within the scope of the appended claims, without departing from the spirit of the invention.

What is claimed is:

1. A practice or tournament plug for use with a fishing rod and reel having a fishing line therewith, comprising a plug body, a shaft on said plug having a pointed end extending from one end of said body, said shaft being movable longitudinally relative to said body when said pointed end sticks in a target, a releasable connection for the fishing line on the other end of said body, and means associated with said shaft and movable longitudinally therewith in engagement with said connection to release said releasable connection when said pointed shaft sticks in a target.

2. A practice or tournament plug for use with a fishing line, comprising a plug body having a longitudinal opening therethrough, a shaft extending through said opening, said shaft having a point on one end thereof projecting beyond the one end of said plug, and a releasable connection for the fishing line on the opposite end of said plug from said point adapted to release said line from said body upon longitudinal movement of said shaft in said opening.

3. The plug as set forth in claim 2, wherein said releasable connection includes a knob, and a resilient socket engageable with said knob and separable therefrom.

4. A practice or tournament plug for use with a fishing line, including a shaft having a point on one end thereof, a plug body slidably disposed about said shaft to permit relative longitudinal movement between said shaft and said body, means on said body and said shaft to limit said relative longitudinal movement between said shaft and said body, and a releasable connection for the fishing line on the other end of said body adapted to be released upon longitudinal movement of said shaft relative to said body.

5. The plug set forth in claim 4, including a releasable connection on end of said plug for said fishing line, said relative longitudinal movement of said shaft effecting the release of said connection.

6. The combination with a practice plug body having a longitudinal opening therethrough, of a shaft slidably disposed in said opening, a knob secured to said body and having an opening therethrough aligned with said opening in said body, and a resilient socket detachably mounted on said knob, said knob being released from said knob upon longitudinal movement of said shaft through said knob into contact with said resilient socket.

7. The combination with a practice plug body having a longitudinal opening therethrough, of a shaft slidably disposed in said opening, a resilient socket on said body, and a detachable knob disposed in said socket, said knob being released from said socket upon said shaft moving longitudinally relative to said plug into contact with said knob.

8. A practice or tournament plug for use with a fishing rod and reel having a fishing line therewith, comprising a plug body, a shaft on said plug having a pointed end extending from one end of said body, a releasable connection for the fishing line on the other end of said body, means associated with said shaft to release said releasable connection when said pointed shaft sticks in a target, said releasable connection including a knob and a resilient socket engageable with said knob and separable therefrom.

References Cited in the file of this patent

UNITED STATES PATENTS

| Number | Name | Date |
|---|---|---|
| 206,694 | Taylor | Aug. 6, 1878 |
| 1,168,808 | Hoffman | Jan. 18, 1916 |
| 1,893,787 | Schroeder | Jan. 10, 1933 |
| 1,976,065 | Forkner | Oct. 9, 1934 |
| 2,021,792 | Le Baw | Nov. 19, 1935 |

FOREIGN PATENTS

| Number | Country | Date |
|---|---|---|
| 546,079 | Great Britain | June 26, 1942 |
| 594,574 | Great Britain | Nov. 14, 1947 |